(12) United States Patent
Burns

(10) Patent No.: US 9,450,432 B1
(45) Date of Patent: Sep. 20, 2016

(54) PORTABLE MIRROR CHARGER

(71) Applicant: Dronk, LLC, Dallas, TX (US)

(72) Inventor: Stephen Burns, Dallas, TX (US)

( * ) Notice: Subject to any disclaimer, the term of this patent is extended or adjusted under 35 U.S.C. 154(b) by 316 days.

(21) Appl. No.: 14/146,672

(22) Filed: Jan. 2, 2014

(51) Int. Cl.
*H02J 7/00* (2006.01)

(52) U.S. Cl.
CPC .................... *H02J 7/0047* (2013.01)

(58) Field of Classification Search
USPC .......................................... 320/107
See application file for complete search history.

(56) References Cited

U.S. PATENT DOCUMENTS

| | | |
|---|---|---|
| 4,269,206 A | 5/1981 | Boyd |
| 8,343,670 B2 | 1/2013 | Hoffman et al. |
| 8,368,346 B2 | 2/2013 | Batson et al. |
| 2010/0061048 A1* | 3/2010 | Mills ............ G04G 17/00 361/679.21 |
| 2012/0279516 A1* | 11/2012 | Bouix ............ A45D 33/008 132/301 |

\* cited by examiner

*Primary Examiner* — Robert Grant
(74) *Attorney, Agent, or Firm* — Law Office of Sam Sokhansanj PLLC

(57) ABSTRACT

A combined portable charger and mirror is provided that can store and deliver energy to charge portable electronic devices without accessing external power sources and that also functions as a portable illuminated vanity mirror. The charger enables users of portable equipment and devices (e.g., cellular telephone, cameras, tablets, computers, etc.) to carry additional stored energy to extend the device's use time. The combined portable charger and vanity mirror includes a housing comprised of a top casing and a bottom casing coupled to each other, a reflective mirror coupled to the top casing, a rechargeable battery within the housing, one or more illuminated lights adjacent to the mirror, a light indicator configured to provide a visual indication of the battery charge level, and a communication interface for transmitting electrical current from the battery to one or more electronic devices. The combined charger further includes a power switch configured to place the charger in an active charging mode or inactive non-charging mode.

20 Claims, 5 Drawing Sheets

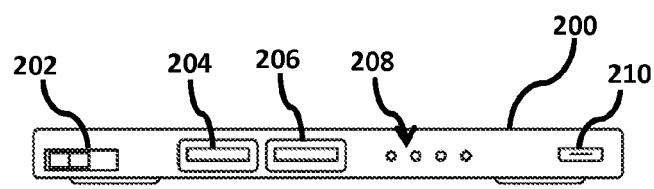
FIG. 11
FIG. 12
FIG. 13
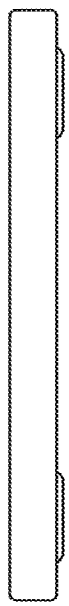
FIG. 14
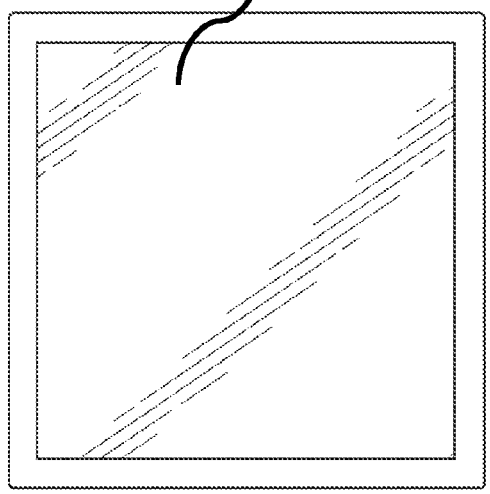
FIG. 15
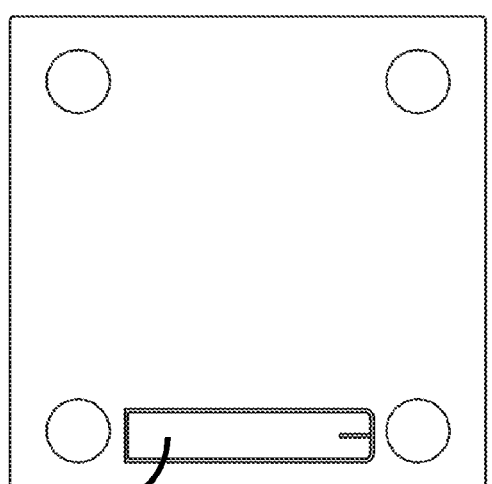
FIG. 16

PORTABLE MIRROR CHARGER

FIELD OF THE INVENTION

The present solution generally relates to a combined portable mobile device charger and illuminated vanity mirror.

BACKGROUND

This section is intended to introduce the reader to aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The run-times of portable devices (e.g., cell phones, PDA's, etc.) are limited by the size of the battery packs used to power these devices. Generally, the battery packs of these devices are recharged by connecting the batteries and/or the devices to chargers that receive power from external AC or DC power sources.

When a user travels and does not have access to the typical external power sources used to recharge the battery packs powering the user's various portable devices, the user is generally required to carry extra batteries and/or bulky chargers for each portable device he or she has to extend the use time of those devices.

In addition, portable mirrors are a necessity for traveling women for carefully applying makeup. Traveling women are often required to consistently apply makeup in a professional manner with high-fashion looks and quality results, regardless of their location. Unfortunately, this requires the women to carry on at all times one or more mirrors and make up accessories in order to consistently and properly apply makeup when traveling or on the go. Hence, for a traveling or mobile man or women who desires both a portable charger and portable mirror, he or she will need to carry on himself or herself at least two separate physical items.

As can be seen, there is a need for a combined portable charger and portable mirror that allows both men and women to charge their mobile electronic devices and further allow them to use a mirror to check any facial or body area and/or apply make-up regardless of their location.

BRIEF SUMMARY OF THE INVENTION

Disclosed is a combination portable charger device and illuminated vanity mirror that can store and deliver energy to charge portable electronic devices without accessing external AC or DC power sources. The charger enables users of portable equipment and devices (e.g., cellular telephones, PDAs, cameras, computers, laptops, tablets, etc.), to carry additional stored energy to extend the device's use time or for emergency use. The portable charger can be charged from either AC sources or from a DC source such as a 14V DC sources commonly available in automobiles. Further, the portable charger provides an added benefit of also functioning as a portable vanity mirror with lights for checking a user's appearance.

In one aspect of the present solution, a portable charger device for charging one or more electronic devices is provided. The portable charger includes a housing configured to hold at least one battery and a communication interface coupled to the housing configured to transfer energy from the battery to the one or more electronic devices. In addition, the housing includes a reflective mirror surface and one or more lights adjacent to the mirror surface and wherein the mirror surface is further coupled to the housing. The portable charger further includes a light controller coupled to the housing configured to allow a user to control power to the one or more lights wherein the lights are light emitting diodes (LED). The portable charger also includes a battery charge level indicator wherein the battery indicator includes a plurality of lights.

The portable charger of the present solution can also include a power switch configured to place the charger in an active charging mode or inactive non-charging mode. The communication interface of the portable charger can further be configured for wireless communication with the one or more electronic devices. Alternatively, the communication interface can be a port configured to electrically connect the one or more electronic devices to the charger. The housing of the portable charger can further include a pivoting stand configured to prop the charger at an angle with respect to a horizontal plane. Further, the housing can also include a projected lip area wherein the lip extends along one side of the housing. Here, the reflective mirror surface of the portable charger can be a two-way mirror. The one or more lights of the portable charger can be positioned below the reflective mirror surface. In addition, the communication interface of the portable charger can be a Universal Serial Bus (USB). Here, the light controller can be a rotatable knob. The portable charger can further include a controller for controlling charging operation of the one or more electronic devices.

In another aspect of the present solution, a combined portable charger and vanity mirror are provided. The combined portable charger and vanity mirror can include a housing comprised of a top casing and a bottom casing coupled to each other, a reflective mirror coupled to the top casing, a rechargeable battery within the housing, a light indicator configured to provide a visual indication of the battery charge level, and a communication interface for transmitting electrical current from the battery to one or more electronic devices. The combined charger can further include a power switch configured to place the charger in an active charging mode or inactive non-charging mode. The combined portable charger can also include one or more lights adjacent to the mirror.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 11 illustrates a rear view of another non-limiting embodiment for the portable mirror charger of the present solution.

FIG. 12 illustrates a front view of the portable mirror charger shown in the embodiment of FIG. 11.

FIG. 13 illustrates a left view of the portable mirror charger shown in the embodiment of FIG. 11.

FIG. 14 illustrates a right view of the portable mirror charger shown in the embodiment of FIG. 11.

FIG. 15 illustrates a top view of the portable mirror charger shown in the embodiment of FIG. 11.

FIG. 16 illustrates a bottom view of the portable mirror charger shown in the embodiment of FIG. 11.

DETAILED DESCRIPTION

Figure 1:
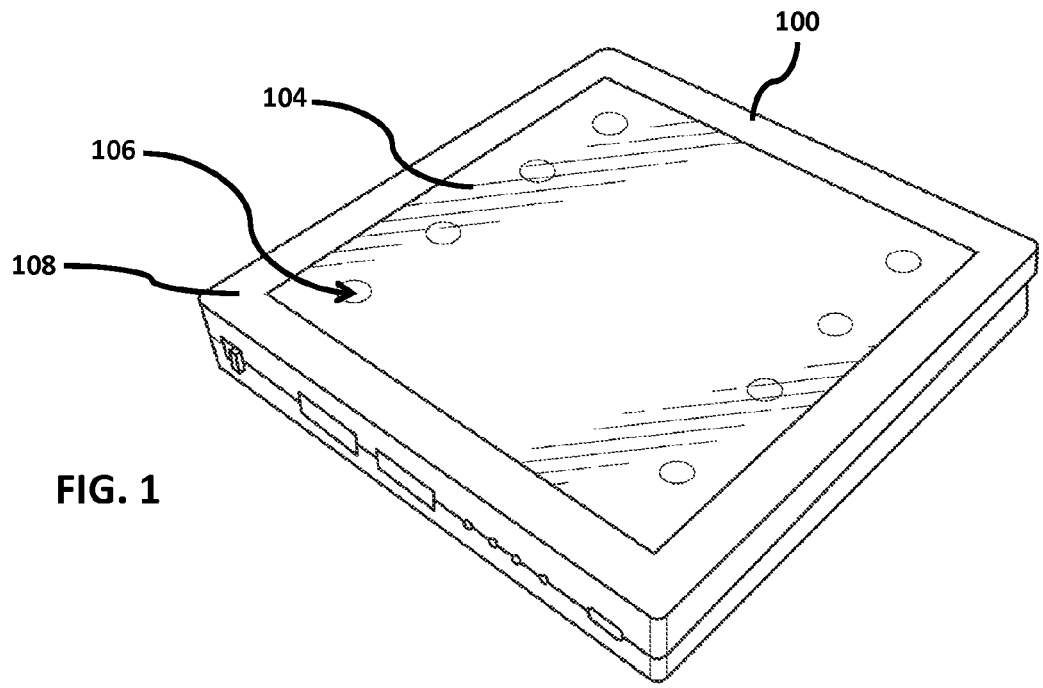
FIG. 1 illustrates a top perspective view of one non-limiting embodiment of the portable mirror charger of the present solution.

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Phrases and terms similar to "software", "application", "algorithm", and "firmware" may include any non-transitory computer readable medium storing thereon a program, which when executed by a computer, causes the computer to perform a method or function.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code in the form of computer-executable instructions or data structures and which can be accessed by a general purpose or special purpose computer.

Any discussion of a mobile device, electronic device, or end device may also apply to any type of electronic networked device, including but not limited to phones such as cellular phones (e.g., an iPhone®, Android®, Blackberry®, or any 'smart phone'), a personal computer, tablet computer, Android® device, iPad®, server computer, or laptop computer; personal digital assistants (PDAs) such as a Palm-based device or Windows® CE device; a roaming device, such as a network-connected roaming device, a wireless device such as a wireless email device or other device capable of communicating wireless with a computer network, or any other type of network device that may communicate over a network and handle electronic transactions. Any discussion of any mobile device mentioned may also apply to other devices.

Figure 4:
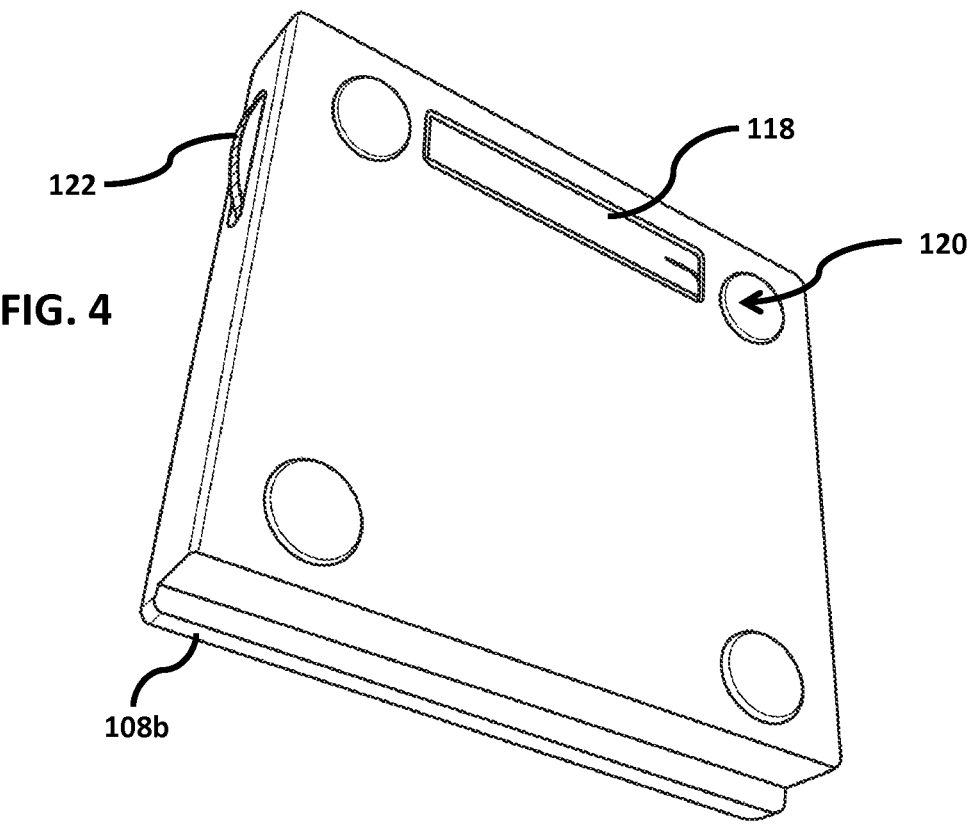
FIG. 4 illustrates a perspective bottom view of the portable mirror charger shown in the embodiment of FIG. 1.

One or more specific embodiments of the present invention will be described below. FIG. 1 illustrates a top perspective view of one embodiment of the portable mirror charger of the present solution. Here, portable mirror charger 100 generally includes a square shaped housing 108, two-way or semi transparent mirror 104, and a plurality of lights 106 positioned below the mirror. Included within housing 108 are one or more internal power batteries 128 (FIG. 5) for charging a variety of electronic devices, such as mobile phones. Lights 106 help illuminate the area being viewed on mirror 104, such as the face of a user, wherein their illumination intensity can be controlled via a rotatable knob 122 (FIG. 4). It is contemplated within the scope of the invention that light source 106 can be of any color and/or intensity and include one or more of: light emitting diode(s) (LEDs), incandescent light bulb(s), fluorescent light bulb(s), compact fluorescent light lamps (CFLs), high intensity discharge (HID), and/or any semiconductor based lighting source. In the current embodiment, there are eight LED lights 106 divided in two vertical rows, with each vertical row having four LED lights substantially equally spaced apart from each other. Lights 106 (either individual or collectively) can use power from 0.5 Watts up to 30 Watts and can generate illumination output from 10 lumens up to 10,000 lumens. It is contemplated within the scope of the invention that there may be any number of lights 106 arranged in any configuration, such as in a pattern or geometric configuration. It is further contemplated within the scope of the invention that housing 108 can be of any shape, including but not limited: rectangular, rectilinear, triangular, circular, ellipsoid, oval, asymmetrical, abstract, or any polygon having three or more sides. It is further contemplated within the scope of the invention that mirror 104 can be semi-transparent, two-way, semi-reflective, or a fully reflective mirror surface.

Figure 2:
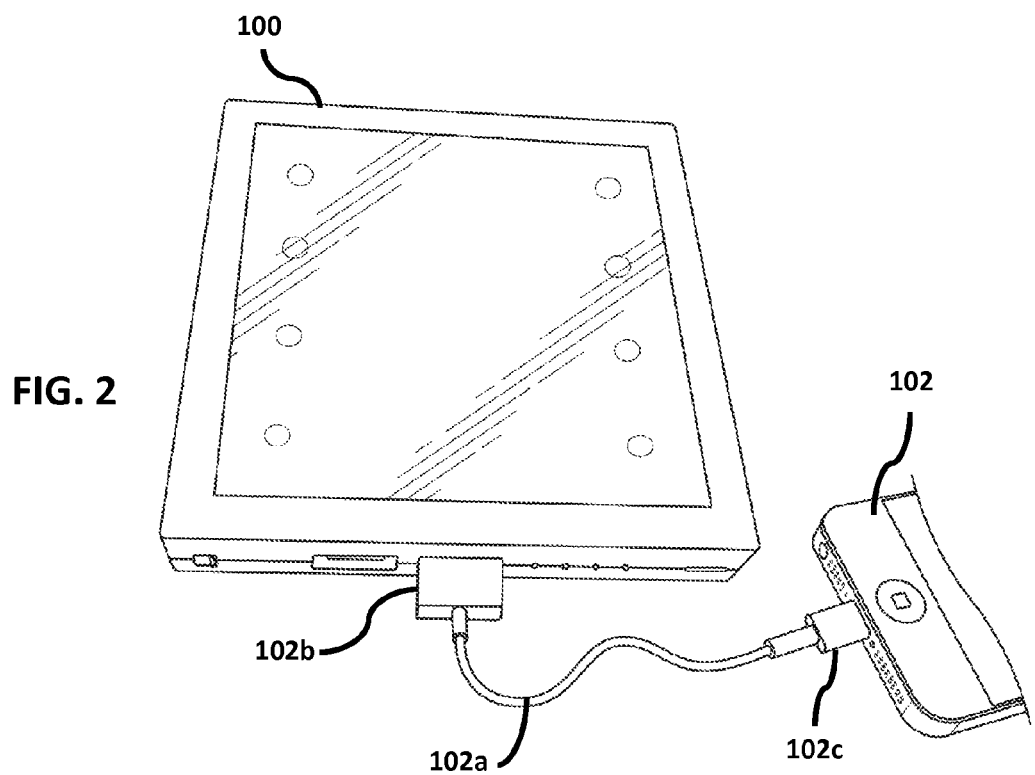
FIG. 2 illustrates a perspective view of the portable mirror charger shown in the embodiment of FIG. 1 coupled to a mobile device.

FIG. 2 illustrates a perspective view of the portable mirror charger 100 shown coupled to a mobile device 102 using a cable connection 102a. Here, the portable mirror charger 100 includes an internal battery pack 128 (FIG. 5) for charging a variety of electronic devices, such as mobile devices. Here, cable connection 102a can be any Universal Serial Bus (USB) based cable, which can include USB 1.1, 2.0, 3.0, 3.1, or any other USB variant and can have an A-type or B-type connector and/or any type of connector proprietary to the electronic or mobile device. Further, cable 102a is shown having a A-type connector 102b at a first end connecting to the portable charger 100 and a proprietary mobile device connector 102c at a second end connecting to the mobile device 102. It is contemplated within the scope of the invention that either of male connector ends 102b or 102c can be any one or more of the following USB or electrical connectors: Type A, Type B, Mini A, Mini B, Micro A, Micro B, and/or Apple® Lightning® cable. Further, cable 102 can be used for either charging mobile device 102 or used as bi-directional communicating medium between charger 100 and mobile device 102. It is contemplated within the scope of the invention that charger 100 can also be used as a USB hub. Alternatively, in lieu of a cable connector, mobile device 102 can be charged or can communicate with charger 100 via wireless connection with the charger, such as an electrically conductive area/component of the mobile device coming in contact with another electrically conductive area/component of the charger. Alternatively, the mobile device may be charged or can communicate with charger 100 using wireless power transmission. Here, wireless power transmission is the transmission of electrical energy from a power source to an electrical load without man-made conductors.

Figure 3:
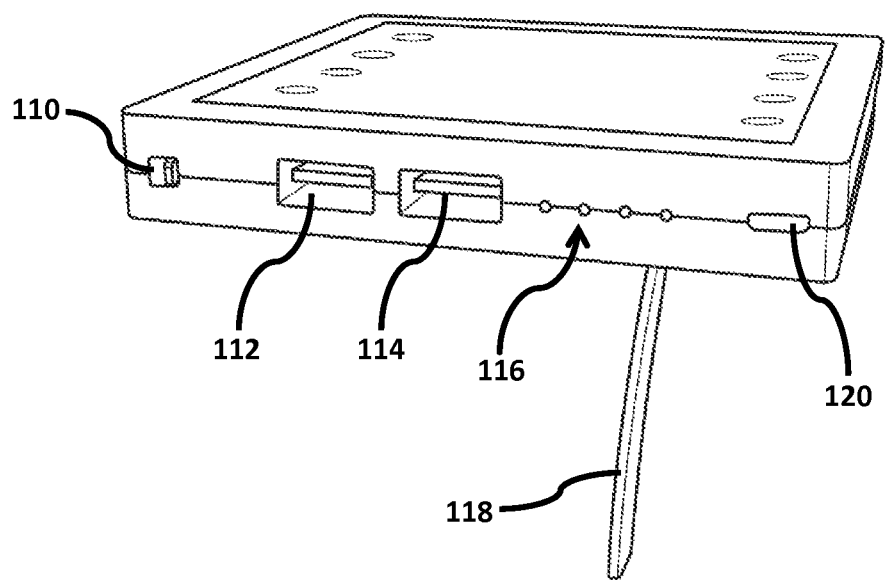
FIG. 3 illustrates a perspective side view of the portable mirror charger shown in the embodiment of FIG. 1.

FIG. 3 illustrates charger 100 having on/off switch 110 and USB receptacle ports 112 and 114. Here, when switch 110 is in the "off" position, no power is going to USB ports 112 and 114, and when 110 is in the "on" position, power from the internal storage is sent to the USB ports 112 and 114 thereby allowing one or more mobile devices to be charged using a cable connected from the mobile to one or more of the ports 112 and 114. Charger 100 further includes internal battery storage power indicator lights 116 and internal battery storage charging micro USB charging receptacle power source 120. Here, indicator lights 116 provide a visual gauge to a user indicating how much battery energy charge is left within charger 100. For example, a full battery charge would have all four lights 116 illuminated, and a much lower battery charge may have one light illuminated.

Still referring to FIG. 3, it is contemplated within the scope of the invention that receptacle 120 can include any type of receptacle for charging the internal batteries of the charger 100, including but not limited to: Type A USB, Type B USB, Mini A USB, Mini B USB, Micro A USB, Micro B USB, Apple® Lightning®, 12V DC port/adapter, and/or 110V AC port/adapter. In addition, it is contemplated within the scope of the invention that either of ports 112 and 114 can be any one or more of: Type A USB, Type B USB, Mini A USB, Mini B USB, Micro A USB, Micro B USB, HDMI, proprietary interfaces, HDMI interfaces, analog to digital audio, accessory control bus, SLIMbus, Firewire, SATA, Ethernet, DPHY and MPHY MIPI interfaces, opto interfaces, Antenna interfaces, and/or Card interfaces (e.g., μSD and M2). In addition, it contemplated within the scope of the invention that charger 100 can have Bluetooth® or wireless networking capabilities that allows it to bi-directionally communicate with one or more mobile devices, and further provide wireless or antenna based charging of one or more mobile devices.

FIG. 4 illustrates a perspective bottom view of the portable mirror charger 100. Here, charger 100 includes a stand 118 that can fold within the body of the housing and unfold within to allow charger 100 to sit an angle on a flat surface (FIG. 3). Charger 100 further includes a plurality of feet 120 to allow the housing to rest flat on a surface. On one side of the housing, a dimmer knob 122 is provided to control the illumination level of lights 106. For example, if the dimmer knob is in the farthest counterclockwise position, then lights 106 can be turned off. If the dimmer knob is gradually rotated in the clockwise direction, then lights 106 will gradually illuminate. If the dimmer knob is rotated to its farthest clockwise direction, then lights 106 will be at their highest illumination/brightest level.

Figure 5:
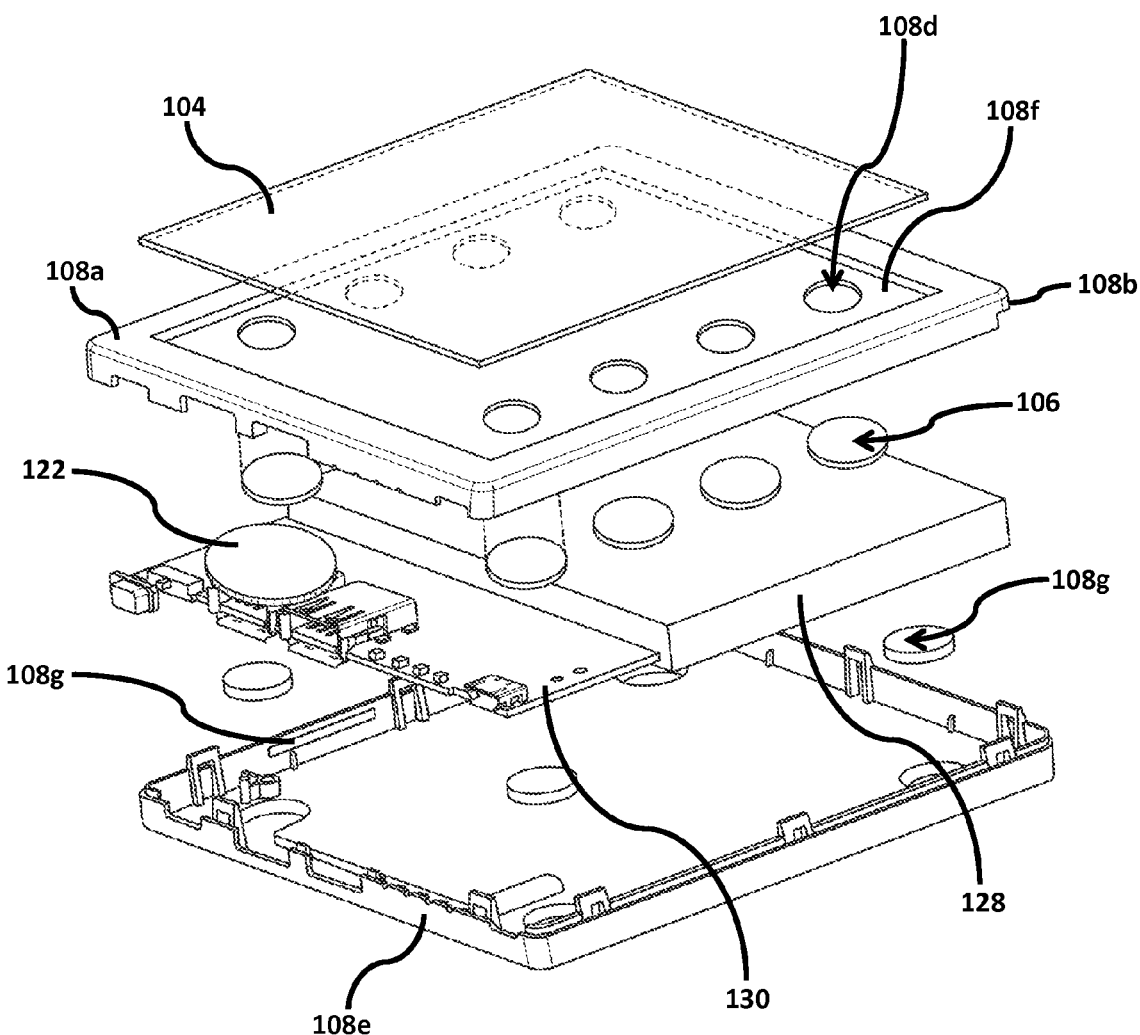
FIG. 5 illustrates an exploded view of the various components for the portable mirror charger shown in the embodiment of FIG. 1
Figure 6:
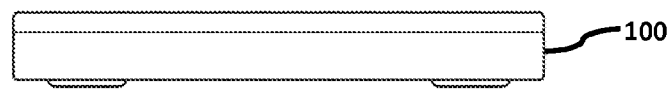
FIG. 6 illustrates a front view of the portable mirror charger shown in the embodiment of FIG. 1

FIG. 5 illustrates an exploded view of the various components for the portable mirror charger 100. Here, housing 108 is divided in two halves that are coupled to each other, top half housing 108a and bottom half housing 108e. Housings 108a and 108e can be coupled to each other via a snap-fit engagement, one or more adhesives, bolts, and/or screws. In other embodiments, housing 108 can be one unitary piece. Further, top half housing 108a has a recessed top surface 108f for securing mirror 104 in place. Mirror 104 can be secured to housing 108 via one or more adhesives or snap-fit engagement. Top half 108a further includes a plurality of apertures 108d for allowing lights 106 to be positioned directly under the apertures 108d, wherein the diameter of the apertures 108d are slightly smaller with respect to the diameter of lights 106. Alternatively, the apertures 108d can be sized approximately as the same size as the lights 106, wherein lights 106 can be positioned either slightly above the apertures 108d or positioned substantially within apertures 108d. Here, LED lights 106 can be configured in a circular disc-like shape or any suitable size or configuration. Lights 106 can be directly connected (not shown) to controller 130 and/or battery storage cells 128.

Still referring to FIG. 5, charger 100 includes internal battery storage cells 128 connected to controller 130 and lights 106. The battery storage cells 128 may be one or more battery packs connected in series-parallel. Further, battery 128 may include Li-ion cells having graphitic anode material or lithium titanate anode material, and lithiated-iron-phosphate cathode materials adapted to enable fast recharge of rechargeable batteries based on such materials. The portable charger 100 may be configured to charge different types of batteries, including, for example, cylindrical batteries, prismatic batteries, button-cell batteries, and so forth. Although FIG. 5 shows a single external battery 128 coupled to the charger 100, the charger 100 may be configured to be coupled and to charge additional external batteries. In addition battery 128 can be a single charge battery wherein the electrochemical cells are meant to be discharged, e.g., to exhaustion, only once, and then discarded and wherein the cells are not intended to be recharged. Here, controller 130 can include power conversion modules, such as AC-DC conversion and/or DC input DC-DC power conversion.

Still referring to FIG. 5, controller 130 includes a processor (not shown) configured to control the charging operations performed on the batteries 128 and controlling operation of on/off switch 110, lights 106, dimmer knob 122, ports 112 and 114, indicator lights 116, and power source 120. The processor can be programmed and may be any type of microcontroller, computing and/or processing device for processing and executing one or more of logic, algorithms, software, or applications. The processor used in the implementation of the controller 130 includes volatile and/or non-volatile memory elements configured to store software containing computer instructions to enable general operations of the processor-based device, as well as implementation programs to perform charging operations on the internal rechargeable batteries 128 disposed within housing 108, including various charging operations and timers (i.e., achieving at least 90% charge capacity of the internal batteries 128 in less than fifteen (15) minutes). The processer of the controller can include an analog-to-digital (A/D) converter with multiple analog and digital input and output lines. The controller can also includes a digital-to-analog (D/A) converter device, and/or a pulse-width modulator (PWM) that receives digital signals generated by the processor and generates in response electrical signals that regulate the duty cycle of switching circuitry.

Still referring to FIG. 5, the dimmer knob 122 is shown connected to controller 130, thereby controlling the illumination level of lights 106. Here, knob 122 can rotate about an axis on controller 130. Further, an elongated opening 108g is provided on the side wall of bottom half 108e. Opening 108g allows knob 122 to be partially exposed (see FIG. 4) thereby allowing a user to easily adjust the brightness of lights 106. In addition, controller 130 and batteries 128 can rest on at least four spacers 108g when the housing is in assembled form.

It is contemplated within the scope of the invention that controller 130 can also communicate bi-directionally with a mobile device, such as transmitting and receiving data to and from a mobile device. Such data can be transmitted wirelessly (such as Bluetooth® or network wireless connection) or via a physical connection to the mobile device. For example, an application residing and operating on the mobile device may communicate and send and receive commands to and from charger 100 via controller 130. Such commands may include power conservation schemes, charging start/stop timers, light illumination control, audio, video, and/or multimedia control. For example, charger 100 can also include internal speakers (not shown), wherein the mobile device can transmit audio to the charger 100 and the charger can play the audio via its internal speakers. For example, the aforementioned audio signals can be transmitted from the mobile device wirelessly (such as via Bluetooth® connection between the mobile device and charger) or via a physical connection to the charger (such as the same connection wire used to charge the mobile device).

Figure 7:
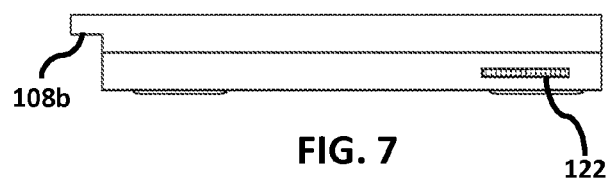
FIG. 7 illustrates a left side view of the portable mirror charger shown in the embodiment of FIG. 1
Figure 8:
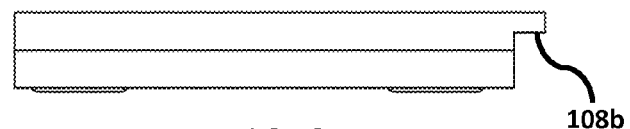
FIG. 8 illustrates a right side view of the portable mirror charger shown in the embodiment of FIG. 1.
Figure 9:
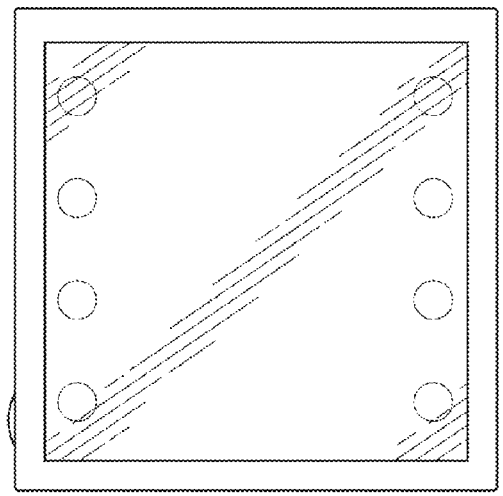
FIG. 9 illustrates a top view of the portable mirror charger shown in the embodiment of FIG. 1.
Figure 10:
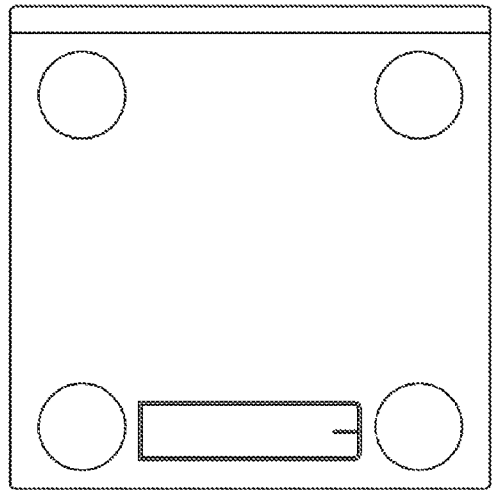
FIG. 10 illustrates a bottom view of the portable mirror charger shown in the embodiment of FIG. 1.

FIGS. 6-10 illustrate various additional views of charger 100. Referring to FIGS. 5, 7, and 8, charger 100 is shown to also include an integrated lip 108b that slightly projects from the top portion of top housing 108a. Here, lip 108b can provide a means for holding an item resting on the top of the housing 108. For example, when charger 100 is coupled (via one or more adhesives, hangers, brackets, tack, screw, or nail) to a vertical surface such as a wall, a user can place one or more item (such as makeup items/accessories) within the recessed portion that forms between the inside surface of lip 108b and the outside surface of the wall. It is contemplated within the scope of the invention that lip 108b can be of any suitable length, height, or width.

FIGS. 11-16 illustrate various views for another embodiment of a charger 200. Here, charger 200 is slightly smaller and slimmer in one or more of length, height, and width than charger 100, while still maintaining a plurality of the components of charger 100, as previously discussed within this disclosure. For example, in some embodiments, charger 200 also includes a mirror 212, controller (not shown), battery storage pack (not shown), on/off switch 202, USB ports 204 and 206, battery power indicator lights 208, micro USB power source 210, and foldable stand 214. In addition, it is contemplated within the scope of the invention that charger 200 can include one or more lights (not shown) positioned under the mirror 212, wherein the power of the lights are controlled by on/off switch 202 or a controllable dimmer knob (not shown).

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention. Although the present invention has been described in considerable detail with reference to certain preferred versions or embodiments thereof, other versions and embodiments are possible.

What is claimed is:

1. A portable charger device for charging one or more electronic devices, comprising:
    a housing having a top half and a bottom half in the same axial plane, wherein the top half is secured to the bottom half;
    a semi-transparent mirror coupled to the top half of the housing;
    a plurality of lights disposed below the semi-transparent mirror, wherein the lights are configured to emit light through the semi-transparent mirror;
    a battery disposed below the mirror, and further disposed between the top half and the bottom half of the housing;
    a communication interface disposed between the top half and bottom half of the housing, wherein the communication interface is configured to transfer energy from the battery to one or more electronic devices; and
    a light controller coupled to the housing configured to control power to the lights.

2. The portable charger of claim 1, further comprising a battery charge level indicator.

3. The portable charger of claim 2, wherein the battery indicator comprises a plurality of lights.

4. The portable charger of claim 1, further comprising a power switch configured to place the charger in an active charging mode or inactive non-charging mode.

5. The portable charger of claim 1, wherein the top half further comprises a plurality of openings, and wherein the lights are disposed either within or below the openings.

6. The portable charger of claim 1, wherein the communication interface is configured for wireless communication with the one or more electronic devices.

7. The portable charger of claim 1, wherein the communication interface is a port configured to electrically connect the one or more electronic devices to the charger.

8. The portable charger of claim 1, wherein the housing further comprises a stand positioned on one side of the housing configured prop the charger at an angle with respect to a horizontal plane.

9. The portable charger of claim 1, wherein the housing further comprises a projected lip region.

10. The portable charger of claim 1, wherein a lip extends along the top half of the housing.

11. The portable charger of claim 1, wherein the reflective surface is a two-way mirror.

12. The portable charger of claim 1, wherein the lights are located below the reflective surface.

13. The portable charger of claim 1, wherein the communication interface is a Universal Serial Bus (USB).

14. The portable charger of claim 1, wherein the lights are comprised of light emitting diodes (LED).

15. The portable charger of claim 1, wherein the light controller comprises a rotatable knob.

16. The portable charger of claim 1, further comprising a controller for controlling a charging operation.

17. A combined portable charger and vanity mirror, comprising:
- a housing comprised of a top casing and a bottom casing coupled to each other;
- a reflective mirror surface coupled to the top casing;
- a plurality of lights disposed below the reflective mirror, wherein the lights are configured to emit light through the reflective mirror;
- a rechargeable battery disposed between the top casing and the bottom casing;
- a light indicator configured to provide a visual indication of the battery charge level;
- a communication interface for transmitting electrical current from the battery to one or more electronic devices; and
- a power switch configured to place the charger in an active charging mode or inactive off mode.

18. The combined portable charger and vanity mirror of claim 17, further comprising one or more lights adjacent to the reflective mirror surface.

19. A portable charger, comprising:
- a housing comprised of a top casing and a bottom casing coupled to each other;
- the top casing further comprising a lip extension;
- an elongated retractable stand coupled to the bottom casing, wherein the stand is smaller in dimension than the bottom casing;
- a reflective mirror surface coupled to the top casing;
- a plurality of lights disposed below the reflective mirror, wherein the lights are configured to emit light through the reflective mirror;
- a rechargeable battery disposed between the top casing and the bottom casing;
- a communication interface disposed between the top casing and the bottom casing, wherein both the top casing and the bottom casing comprise a cut-out region for the communication interface;
- a light indicator configured to provide a visual indication of the battery charge level; and
- a power switch configured to place the charger in an active charging mode or inactive off mode.

20. The portable charger of claim 1, wherein the top casing further comprises a plurality of apertures disposed below the reflective surface, wherein each of the apertures further comprise a light source.

* * * * *